United States Patent
Andorko

(10) Patent No.: US 11,375,133 B2
(45) Date of Patent: Jun. 28, 2022

(54) AUTOMATIC EXPOSURE MODULE FOR AN IMAGE ACQUISITION SYSTEM

(71) Applicant: FotoNation Limited, Galway (IE)

(72) Inventor: Istvan Andorko, Galway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 16/915,987

(22) Filed: Jun. 29, 2020

(65) Prior Publication Data

US 2020/0404149 A1 Dec. 24, 2020

Related U.S. Application Data

(63) Continuation of application No. 15/609,314, filed on May 31, 2017, now Pat. No. 10,701,277.

(51) Int. Cl.
*G06V 40/00* (2022.01)
*H04N 5/235* (2006.01)
(Continued)

(52) U.S. Cl.
CPC ........... *H04N 5/2353* (2013.01); *G01S 3/00* (2013.01); *G06V 40/19* (2022.01); *H04N 5/2352* (2013.01);
(Continued)

(58) Field of Classification Search
CPC ........ G06K 9/00; G06K 9/20; G06K 9/00604; G06K 9/0061; G06K 9/00617;
(Continued)

(56) References Cited

U.S. PATENT DOCUMENTS

| 2,195,748 | A | * | 4/1940 | Leber | G01J 1/40 |
| | | | | | 356/235 |
| 4,241,456 | A | * | 12/1980 | Nakagaki | G08C 23/04 |
| | | | | | 250/214 B |

(Continued)

FOREIGN PATENT DOCUMENTS

| WO | 2007106117 A2 | 9/2007 |
| WO | 2008018887 A1 | 2/2008 |

(Continued)

OTHER PUBLICATIONS

J. Daugman, "New methods in iris recognition," IEEE Trans. Syst. Man. Cybern. B. Cybern., vol. 37, No. 5, Oct. 2007. pp. 1167-1175.

(Continued)

*Primary Examiner* — Frank F Huang
(74) *Attorney, Agent, or Firm* — Lee & Hayes, P.C.

(57) ABSTRACT

A method for automatically determining exposure settings for an image acquisition system comprises maintaining a plurality of look-up tables, each look-up table being associated with a corresponding light condition and storing image exposure settings associated with corresponding distance values between a subject and the image acquisition system. An image of a subject is acquired from a camera module; and a light condition occurring during the acquisition is determined based on the acquired image. A distance between the subject and the camera module during the acquisition is calculated. The method then determines whether a correction of the image exposure settings for the camera module is required based on the calculated distance and the determined light condition; and responsive to correction being required: selects image exposure settings corresponding to the calculated distance from the look-up table corresponding to the determined light condition; and (Continued)

acquires a new image using the selected image exposure settings.

20 Claims, 5 Drawing Sheets

(51) Int. Cl.
    *G01S 3/00*     (2006.01)
    *H04N 5/232*     (2006.01)
    *H04N 5/243*     (2006.01)
    *G06V 40/19*     (2022.01)
    *G08B 13/196*     (2006.01)

(52) U.S. Cl.
    CPC ....... *H04N 5/2354* (2013.01); *H04N 5/23219* (2013.01); *H04N 5/243* (2013.01); *G08B 13/196* (2013.01); *G08B 13/1961* (2013.01); *G08B 13/19602* (2013.01); *G08B 13/19604* (2013.01)

(58) Field of Classification Search
CPC .. G06K 9/00597; G06K 9/2018; G06K 9/228; G06K 9/2027; H04N 1/00; H04N 5/2256; H04N 1/00307; H04N 5/3532; H04N 5/2354; H04N 5/33; H04N 5/332; H04N 3/09; G01J 5/02; G01J 2005/0077
See application file for complete search history.

(56) References Cited

U.S. PATENT DOCUMENTS

| | | | | |
|---|---|---|---|---|
| 4,547,057 A * | 10/1985 | Kataoka | .................. | G03B 7/16 396/157 |
| 4,801,964 A * | 1/1989 | Desormeaux | ............ | G03B 7/16 396/106 |
| 5,159,381 A * | 10/1992 | Harrison | ................ | G03B 15/05 396/156 |
| 6,389,232 B2 * | 5/2002 | Ishihara | .................. | G03B 7/28 396/161 |
| 6,525,763 B1 * | 2/2003 | Maeda | ................. | H04N 1/4092 348/354 |
| 6,564,014 B1 * | 5/2003 | Takeuchi | ................ | G03B 7/08 396/157 |
| 6,724,419 B1 * | 4/2004 | Green | .................. | G02B 21/367 348/79 |
| 6,734,894 B1 * | 5/2004 | Higuchi | ................. | H04N 7/183 348/363 |
| 7,295,765 B1 * | 11/2007 | Kijima | .................. | H04N 5/772 348/294 |
| 7,489,333 B2 * | 2/2009 | Dobashi | ................. | A61B 3/14 348/78 |
| 8,045,002 B2 * | 10/2011 | Gladnick | ............. | H04N 5/2354 348/132 |
| 8,488,958 B2 | 7/2013 | Brunner et al. | | |
| 2002/0034067 A1 * | 3/2002 | Massaro | ................ | G06Q 30/06 361/728 |
| 2003/0136832 A1 * | 7/2003 | Massaro | ................ | G06Q 30/06 235/383 |
| 2004/0195774 A1 * | 10/2004 | Segan | .................. | G04B 47/048 273/359 |
| 2007/0049159 A1 * | 3/2007 | Kulis | ..................... | A63H 17/28 446/438 |
| 2007/0103890 A1 * | 5/2007 | Morehead | ............ | A01K 27/006 362/103 |
| 2007/0164115 A1 * | 7/2007 | Joseph | ............... | G06K 7/10722 235/462.21 |
| 2007/0228755 A1 * | 10/2007 | Alvarado | ............... | B62D 41/00 296/1.07 |
| 2015/0294128 A1 * | 10/2015 | Kawashima | ....... | G06K 7/10722 235/454 |
| 2016/0125178 A1 * | 5/2016 | Danikhno | ............... | G06F 16/00 726/18 |
| 2016/0378266 A1 * | 12/2016 | Lu | ....................... | G06K 9/00543 345/175 |
| 2017/0045617 A1 * | 2/2017 | Masuda | .................. | G01S 17/08 |
| 2017/0061210 A1 * | 3/2017 | Ollila | ................. | H04N 1/00307 |
| 2017/0131088 A1 * | 5/2017 | Masuda | ................. | G01S 17/10 |
| 2017/0277950 A1 * | 9/2017 | Sung | .................. | G06K 9/2018 |
| 2017/0289421 A1 * | 10/2017 | Tan | .................... | G06K 7/10722 |
| 2017/0366761 A1 | 12/2017 | Dainty et al. | | |
| 2018/0189547 A1 * | 7/2018 | Daniels | ................ | G06K 9/2027 |
| 2019/0313009 A1 * | 10/2019 | Alameh | ............. | G06K 9/00255 |

FOREIGN PATENT DOCUMENTS

| | | |
|---|---|---|
| WO | 2011124512 A2 | 10/2011 |
| WO | 2016091545 A1 | 6/2016 |
| WO | 2016134942 A1 | 9/2016 |
| WO | 2016177914 A1 | 11/2016 |
| WO | 2017144733 A1 | 8/2017 |

OTHER PUBLICATIONS

Office action for U.S. Appl. No. 15/609,314, dated Jul. 15, 2019, Andorko, "Automatic exposure module for an image acquisition system", 11 pages.

* cited by examiner

Figure 2

200 — Indoor condition

| Distance [cm] | Texposure | Gain |
|---|---|---|
| 20 | 9 | 2 |
| 22 | 10 | 2 |
| 24 | 12 | 2 |
| 26 | 9 | 3 |
| 28 | 10 | 3 |
| 30 | 11 | 3 |
| 32 | 12 | 3 |
| 34 | 12 | 3 |
| 36 | 10 | 4 |

201 — Outdoor overcast condition

| Distance [cm] | Texposure | Gain |
|---|---|---|
| 20 | 10 | 1 |
| 22 | 11 | 1 |
| 24 | 12 | 1 |
| 26 | 8 | 2 |
| 28 | 8 | 2 |
| 30 | 9 | 2 |
| 32 | 10 | 2 |
| 34 | 10 | 2 |
| 36 | 10 | 2 |

202 — Outdoor sunny condition

| Distance [cm] | Texposure | Gain |
|---|---|---|
| 20 | 4 | 1 |
| 22 | 4 | 1 |
| 24 | 5 | 1 |
| 26 | 5 | 1 |
| 28 | 5 | 1 |
| 30 | 5 | 1 |
| 32 | 6 | 1 |
| 34 | 6 | 1 |
| 36 | 6 | 1 |

AUTOMATIC EXPOSURE MODULE FOR AN IMAGE ACQUISITION SYSTEM

CROSS-REFERENCE TO RELATED APPLICATIONS

This application is a continuation of U.S. patent application Ser. No. 15/609,314, filed May 31, 2017, which is incorporated by reference herein in its entirety.

FIELD

The present invention relates to an automatic exposure (AE) module for an image acquisition system and a method of operating an automatic exposure module.

BACKGROUND

Automatic exposure involves the setting of image exposure time as well as image sensor gain in an image acquisition system.

In an image acquisition system used for iris recognition, an image of an iris region is typically acquired using infra-red (IR) illumination to bring out the main features of a subject's underlying iris pattern. Iris segmentation is performed on the detected region of the image in order to define an iris segment, and then feature extraction is performed on the iris segment. The extracted features can be used to generate an iris code for the subject of the acquired image and this can be used in conjunction with stored iris code(s) to identify, recognize or authenticate the subject of the image.

In the case of iris recognition, the requirement for automatic exposure is to be very fast. Indeed, users expect to be authenticated almost instantly by the iris recognition system, and for this reason, processing time cannot be wasted for automatic exposure.

SUMMARY

According to a first aspect of the present invention there is provided an automatic exposure method according to claim 1. There are also provided an image acquisition system and a computer program product according to claims 13 and 14 respectively.

Embodiments of the present invention provide automatic exposure which is fast and may only require a single acquired frame in order to determine the required exposure and gain values for acquiring an image to be used for iris recognition.

The automatic exposure method is based on acquiring an image in a semi-controlled environment. In some embodiments, the image acquisition system comprises an infra-red (IR) illumination source for illuminating a subject, and the image acquisition system comprises at least an image sensor and a filter arranged to allow the passage therethrough of selected IR wavelengths (corresponding to the wavelengths emitted by the illumination source) towards the image sensor. Because of the IR filter and the active IR illumination, there is only a limited number of light conditions in which iris recognition needs to work. Because of a limited number of light conditions to be considered, the image acquisition settings can be adjusted based on the distance between the subject and the image acquisition system.

In particular, a limited set of look-up tables can be maintained, each one associated with a corresponding possible light condition and storing image acquisition settings for the image acquisition system which are associated to corresponding distance values between the subject and the image acquisition system.

When a correction of the image acquisition settings is required, a calculated distance during the image acquisition between the subject and the image acquisition system can be used as an index for selecting corresponding image acquisition settings from the look-up table corresponding to a determined light condition.

In this way, the distance-based AE method can adjust image acquisition settings of the during the image acquisition system quickly. Indeed, once the look-up tables are filled and maintained, the method may only require a single image acquisition, a discrimination between a limited number of light conditions, and a measurement of the distance between the subject and the image acquisition system to determine the required image acquisition settings.

BRIEF DESCRIPTION OF THE DRAWINGS

Embodiments of the invention will now be described, by way of example, with reference to the accompanying drawings, in which:

FIG. 2 illustrates portions of three exemplary look-up tables usable in the method illustrated in FIG. 1;

DETAILED DESCRIPTION

Figure 1:
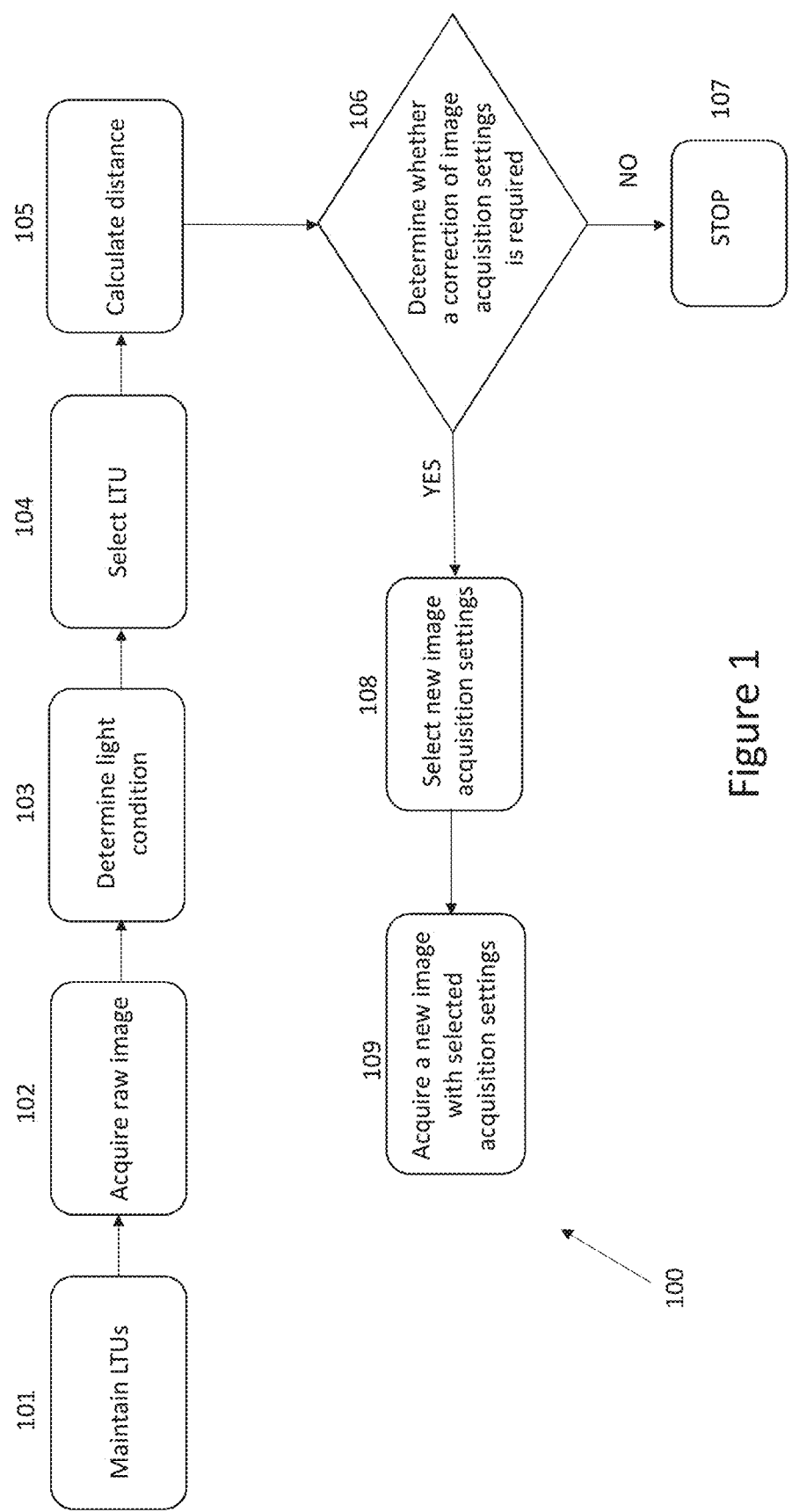
FIG. 1 illustrates a method according to an embodiment of the present invention.
Figure 5:
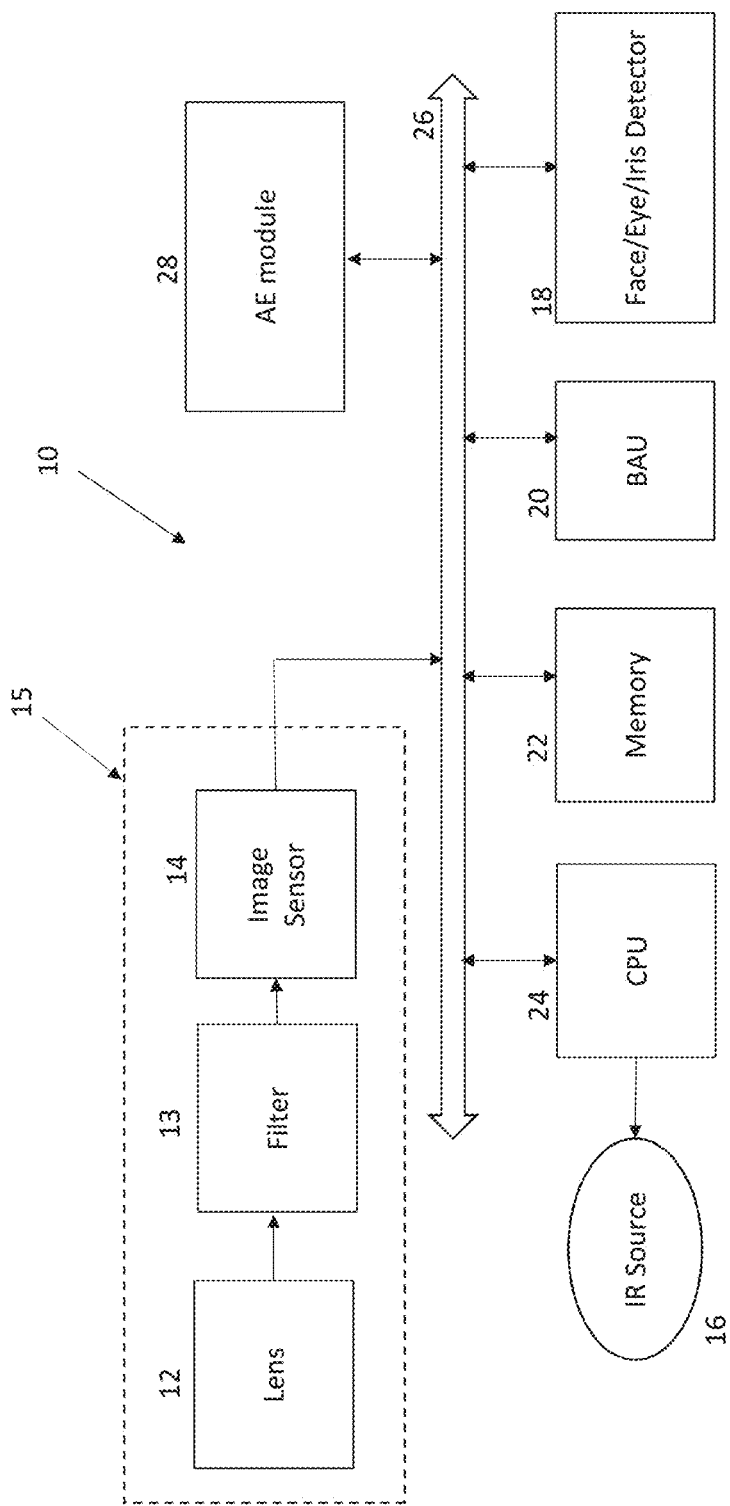
FIG. 5 illustrates an image acquisition system for iris recognition according to an embodiment of the present invention.

Referring now to FIGS. 1 and 5, there are shown respectively an AE method 100 according to an embodiment of the present invention and an image acquisition system 10 for iris recognition including an AE module 28 which operates according to the method 100.

The system 10, which may comprise for example, a camera, a smartphone, a tablet or the like, comprises a central processing unit (CPU) 24 which typically runs operating system software as well as general purpose application software, for example, camera applications, browser, messaging, e-mail or other apps. The operating system may be set so that a user must authenticate themselves to unlock the system and to gain access to applications installed on the system; or individual applications running on the system may require a user to authenticate themselves before they gain access to sensitive information.

The system 10 comprises at least one IR illumination source 16 capable of acquiring an image, such as a facial image of a predetermined subject to be recognized and authenticated by the system 10.

The IR illumination source 16, which can for example be a NIR LED, is configured to illuminate a subject with IR light, preferably NIR light (that is light of approximately 700-1000 nm in wavelength). One suitable LED comprises an 810 nm SFH 4780S LED from OSRAM. In some embodiments more than one illumination source or a tunable illumination source may be employed to emit IR light at different wavelengths.

The system 10 further comprises a camera module 15 having at least a lens assembly 12, an image sensor 14, and a filter 13.

The lens assembly 12 is configured for focusing IR light reflected from the subject illuminated by the IR illumination source 16 onto the sensor 14. The filter 13 is arranged to allow the passage therethrough towards the sensor 14 of selected IR wavelengths (corresponding to the wavelengths emitted by the IR illumination source 16).

A first exemplary lens assembly 12 is disclosed in PCT/EP2016/052395 (Ref: FN-452), the disclosure of which is incorporated herein by reference, which comprises a collecting lens surface with an optical axis and which is arranged to focus IR light received from a given object distance on the image sensor surface. The lens assembly includes at least a first reflective surface for reflecting collected light along an axis transverse to the optical axis, so that a length of the optical system along the optical axis is reduced by comparison to a focal length of the lens assembly.

A second exemplary lens assembly 12 is disclosed in PCT/EP2016/060941 (Ref: FN-466), the disclosure of which is incorporated herein by reference, which comprises a cluster of at least two lenses arranged in front of the image sensor with each lens' optical axis in parallel spaced apart relationship. Each lens has a fixed focus and a different aperture to provide a respective angular field of view. The lens with the closest focus has the smallest aperture and the lens with the farthest focus has the largest aperture, so that iris images can be acquired from subjects at distances from between about 200 mm to 500 mm from an acquisition device.

A third exemplary lens assembly 12 is disclosed in U.S. patent application Ser. No. 15/186,283 filed 17 Jun. 2016 (Ref: FN-477), the disclosure of which is incorporated herein by reference, which comprises an image sensor comprising an array of pixels including pixels sensitive to NIR wavelengths; at least one NIR light source capable of selectively emitting light with different discrete NIR wavelengths; and a processor, operably connected to the image sensor and the at least one NIR light source, to acquire image information from the sensor under illumination at one of the different discrete NIR wavelengths. A lens assembly comprises a plurality of lens elements with a total track length no more than 4.7 mm, each lens element comprising a material with a refractive index inversely proportional to wavelength. The different discrete NIR wavelengths are matched with the refractive index of the material for the lens elements to balance axial image shift induced by a change in object distance with axial image shift due to change in illumination wavelength.

Other variants of these lens assemblies are of course possible.

Typically, images acquired from the image sensor 14 are written into memory 22 as required either by applications being executed by the CPU 24 or other dedicated processing blocks which have access to the image sensor 14 and/or memory 22 across the system bus 26.

In the embodiment, the system 10 further comprises a dedicated face/eye/iris detector 18 for identifying a face region within an acquired image, and within a given face region, one or more eye regions and iris regions within those eye regions. This functionality could equally be implemented in software executed by the CPU 24.

Face detection in real-time has become a standard feature of most digital imaging devices and there are many techniques for identifying such regions within an acquired image, for example, as disclosed in WO2008/018887 (Reference: FN-143), the disclosure of which is incorporated herein by reference. Further, most cameras and smartphones also support the real-time detection of various facial features and can identify specific patterns such as 'eye-blink' and 'smile' so that for example, the timing of main image acquisition can be adjusted to ensure subjects within a scene are in-focus, not blinking or are smiling such as disclosed in WO2007/106117 (Reference: FN-149), the disclosure of which is incorporated herein by reference. Where such functionality is available in an image processing device, detecting and tracking face regions and eye regions within those face regions imposes no additional overhead and so this information is available continuously for a stream of images being acquired by the system 10.

The iris regions are extracted from the identified eye regions and a more detailed analysis may be performed to confirm if a valid iris pattern is detectable. J. Daugman, "New methods in iris recognition," IEEE Trans. Syst. Man. Cybern. B. Cybern., vol. 37, pp. 1167-1175, 2007 discloses a range of additional refinements which can be utilized to determine the exact shape of iris and the eye-pupil. It is also common practice to transform the iris from a polar to rectangular co-ordinate system, although this is not necessary.

Iris regions identified within an acquired image can be used as an input for a biometric authentication unit (BAU) 20. The BAU 20 is configured for analyzing the received iris regions in order to detect whether they belong to a predetermined subject.

The BAU 20 is preferably configured to compare the received one or more iris regions with reference iris region (s) associated to the predetermined subject, which can be stored in memory 22, within secure memory in the BAU 20 or in any location accessible to the BAU 20. An exemplary way for performing iris code extraction and comparison between iris regions is disclosed in WO2011/124512 (Reference: FN-458), the disclosure of which is incorporated herein by reference, and this involves a comparison between two image templates using a master mask to select corresponding codes from the templates. The master mask excludes blocks from the matching process and/or weights blocks according to their known or expected reliability.

Since the system 10 uses active NIR illumination provided by the source 16 and the filter 13, three main light conditions are considered for the operation of the system 10, namely an indoor condition, an outdoor overcast (cloudy) condition, and an outdoor sunny condition.

Referring now to FIG. 1, the method 100 provided by an AE module 28 for the camera module 15 of the system 10 comprises a prerequisite step 101 of maintaining three pre-generated look-up tables (LUTs) 200, 201, 202, which are associated, respectively, with the indoor condition, the outdoor overcast condition and the outdoor sunny condition, FIG. 2.

With reference to FIG. 2, the LUTs 200, 201, 202 store image acquisition settings for the camera module 15. In particular, each one of the LUTs 200, 201, 202 comprises:

- a set of distance values 205 between a subject under recognition and the camera module 15 of the system 10; and
- a pair of gain and exposure time values 206, 207 for the sensor 14 which are associated with each distance value 205.

The method 100 comprises acquiring a raw image of a subject from the camera module 15 (step 102), and determining which of the indoor, outdoor overcast, and outdoor sunny conditions occurred during the acquisition of the raw image, based on the raw image itself (step 103).

Figure 3:
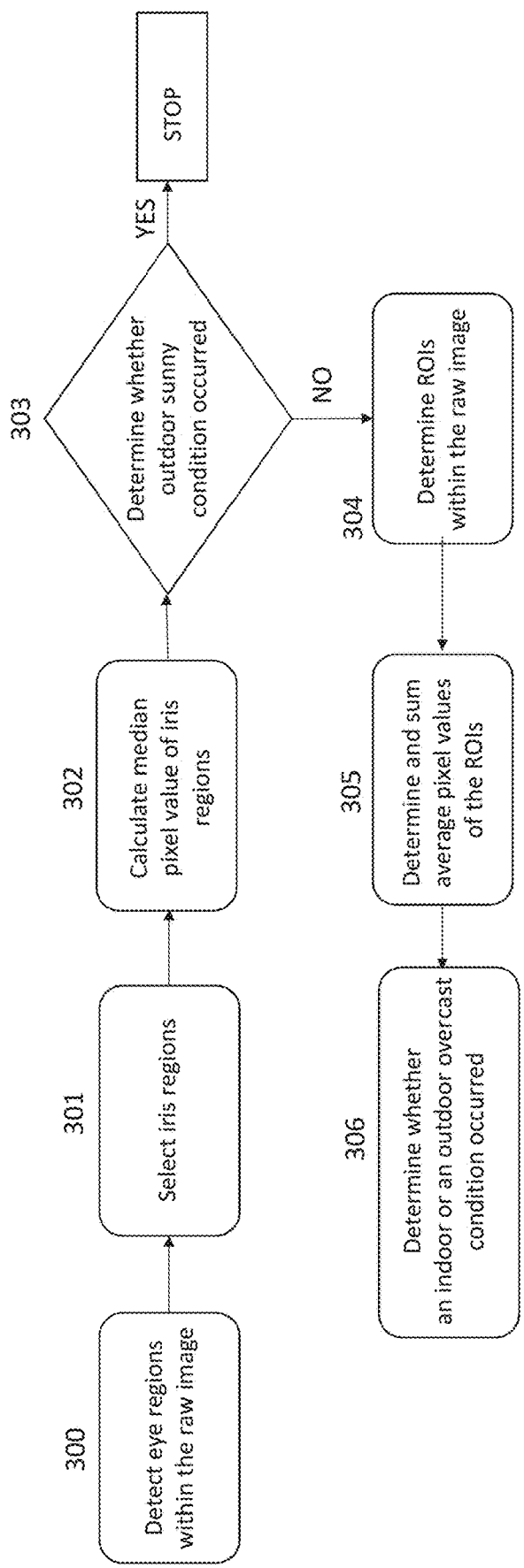
FIG. 3 illustrates an exemplary method for light condition classification, which can be used during the execution of the method illustrated in FIG. 1.

With reference to FIG. 3, an exemplary method to make the determination at step 103 comprises detecting eye regions within the acquired raw image (step 300), and selecting iris regions 350 based on the eye detection (step 301).

The median value of the pixels in each selected iris region is calculated (step 302), and the maximum of the two calculated median values is compared with a threshold to determine whether the outdoor sunny condition occurred in acquiring the raw image (step 303). For example, if the determined maximum median value is greater than the threshold, the raw image is considered to have been captured in the outdoor sunny condition.

The threshold used in the determination at step 303 can be set using Decision Trees on a pre-captured training database. An exemplary threshold value in a range from 0 to a maximum brightness of 255 can be 79.

If the determination at step 303 is positive, the process stops.

Figure 4:
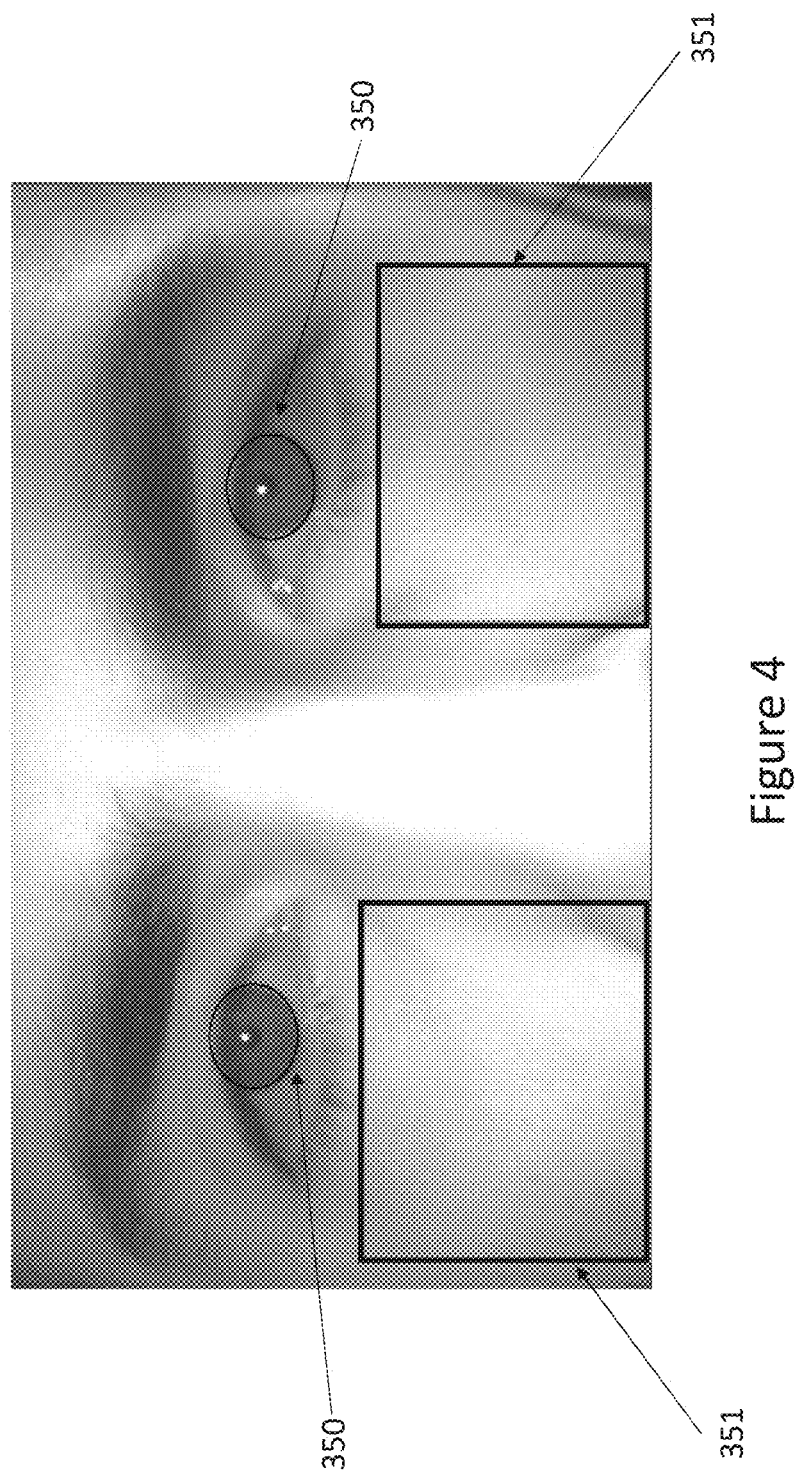
FIG. 4 illustrates an exemplary acquired image containing region of interests which can be detected during the execution of the method illustrated in FIG. 3.

If the determination at step 303 is negative, the process continues by determining regions of interest (ROIs) within the acquired raw image, other than the previously detected iris regions (step 304). With reference to FIG. 4, the ROIs 351 correspond for example to the cheek regions 351 of the subject i.e. rectangular regions disposed below (in an upright face image) the eye regions.

Then, the average pixel values of the ROIs 351 are calculated and summed (step 305). The sum result is compared with a threshold to determine whether the indoor condition or the outdoor overcast condition occurred during the acquisition of the raw image (step 306).

For example, if the sum is below the threshold, the raw image is assumed to have been captured in the indoor condition. If the sum exceeds the threshold, the raw image is assumed to have been captured in the outdoor overcast condition.

Again, the threshold used in the determination at step 306 can be set using Decision Trees on a pre-captured training database. For example, assuming that both eyes are visible, the threshold value can be 262 in a range from 0 to a maximum brightness of 510.

An assumption for the process illustrated in FIG. 3 is that both eyes are visible and detectable in the raw image.

A similar method can also be used to determine the light condition occurred during image acquisition, but using only one iris region for the determination at step 303 and/or only one ROI 351 for the determination at step 304. Such a method can be applied for example when only one eye region is detectable in the raw image.

Alternatively or in addition to the method illustrated in FIG. 3, determining the light condition which pertained during the acquisition of the raw image can comprise checking for a presence of shadows in the areas around the eyes, such as disclosed in PCT Application No. PCT/EP2017/058106 (Ref: FN-491-PCT), the disclosure of which is incorporated herein by reference. If shadows are detected, it could be assumed that the raw image has been captured outdoors, in strong sunlight. Other indicators could also be used, such as checking the time of day—it is unlikely that images being acquired between 9 pm and 6 am are being acquired in strong sunlight, or checking device location. For example, GPS coordinates can indicate if a device is located outside in bright conditions or inside under artificially lit conditions. Other indicators include testing whether the image processing device is connected to or detects a WiFi signal—if not there is a good chance the device is outdoors.

Referring now again to FIG. 1, the LUT 200, 201, 202 is selected which corresponds to the determined light condition (step 104).

The method 100 further comprises calculating a distance between the subject and the camera module 15 during the acquisition of the raw image (step 105).

Distance can be determined directly if the image acquisition system includes a distance measurement device, for example a laser, although this may not be desirable when an image acquisition system is directed towards a user's eyes.

Alternatively, when at least one eye of the subject is detectable in the raw image, the distance to the subject can be calculated from the raw image itself using anthropometric information such as an assumed centre-to-centre pupil distance of about 65 mm as disclosed in PCT Application No. PCT/EP2015/076881 (Ref: FN-399-PCT).

Alternatively or in addition, the distance can be calculated from a depth map generated by using stereo information from both the NIR camera module 15 and a second RGB front facing camera module, typically incorporated in a smartphone for enabling video conferencing or calling.

Based on the distance calculated at step 105 and the light condition determined at step 103, a determination is made as to whether a correction of the image acquisition settings for the camera module 15 is required (step 106).

For example, the determination at step 106 can comprise determining if at least one of the determined light condition and the calculated distance are different than a predetermined light condition and a predetermined distance.

In particular, when the system 10 starts, default exposure time and gain values can be set for a specific distance and light condition. For example, it has been statistically determined that iris recognition is most likely performed indoor with the camera module 15 held at a distance of about 30 cm from the subject under recognition. For this reason, the default exposure time and gain values correspond to the values stored in the LUT 200 and associated to a distance value of 30 cm. Once the raw image is acquired, if a light condition other than indoor is determined and/or the calculated distance is different than 30 cm, a new exposure time and/or gain values may be required.

If no correction is required, the auto-setting method 100 stops (step 107) and the raw image can be used for iris recognition processing. For example, in the system 10 illustrated in FIG. 5, the raw image can be sent to the detector 18 or, if iris regions have been already detected and stored at step 102 for determining the light condition, such regions can be directly provided to the BAU 20.

If a correction of the image acquisition settings is required, the method 100 proceeds with a step 208 of retrieving an exposure time value 207 and a gain value 206 which correspond to the calculated distance from the LUT selected at step 104. In practice, the measured distance is used as an index to access the selected LUT and to retrieve therefrom the pair of new exposure time and gain values that are required for the calculated distance, at the determined light condition.

Clearly, where a distance intermediate the distances stored in the selected LUT has been determined at step 105, either the entry for the closest stored distance can be used and/or interpolation and/or extrapolation from entries within the selected LUT can be employed.

A new image is then acquired from the camera module 15 using the selected exposure time and gain values (step 109).

The above method 100 can be repeated using the new acquired image as a raw image.

With reference again to FIG. 2, the LUTs 200, 201, 202 used in the method 100 are filled with data worked out experimentally. In particular, suitable exposure time and gain values 206, 207 associated to corresponding distance values 205 are chosen based on image quality scores (contrast) which are suitable for the specific iris recognition module implemented by the system 10.

Preferably, the exposure time and gain values are chosen in such a way that in each LUT 200, 201, 202 the product of exposure time and gain increases, with distance. In the example of FIG. 2, exposure values are increased first until a maximum value is reached. After reaching this maximum value, the gain needs to be increased.

For example, as illustrated in FIG. 2, the maximum value is set at 12 ms, since for greater exposure time values there is a risk of having geometrical distortions due to hand motion of the subject.

Concerning the gain, it is kept low while the exposure time is below the maximum value. This in order to minimize the sensor noise in the acquired image. For example, until the exposure time values reach the maximum value, the gain can be kept at a constant low value or can slowly increase.

Once the exposure time reaches the maximum value, either the gain starts increasing or it continues to increase but at a higher rate than before.

In the example of FIG. 2, gain increases at discrete intervals, so it will be seen that when gain changes from 2-3 or 1-2 in tables 200 and 201 respectively, the exposure time needs to be curtailed to provide a relatively smooth progression of exposure.

In any case, the exposure time and gain values of the LUT table 200 are higher than the exposure time and gain values of the LUT 201 at the same corresponding distance values, and the exposure time and gain values of the LUT 202 are higher than the exposure time and gain values of the LUT 202 at the same corresponding distance values. This is because with more light, less exposure time and gain are need to reach the desired image quality score.

While the above disclosed embodiment is described as being performed by a dedicated automatic exposure module 28, the functionality of the module 28 could equally be implemented in software executed by the CPU 24. Equally, the AE module 28 could form a component of a dedicated camera module 15.

The LUTs 200, 201, 202 can be stored in the memory 22 or in any other memory of the system 10 or accessibly by the system 10.

The Face/Eye/Iris detector 18 can be used for the execution of the method illustrated in FIG. 3, in order to detect the iris regions 350 and other ROIs 351 used for discriminating between the light conditions.

The invention claimed is:

1. A method for automatically determining exposure settings for an image acquisition system, the image acquisition system comprising an infra-red (IR) illumination source and an image sensor responsive to selected IR wavelengths, the method comprising:
    acquiring an image of a subject from a camera module while the subject is illuminated by the IR illumination source;
    determining a light condition from among an indoor light condition, an outdoor overcast light condition, and an outdoor sunny light condition present during the acquisition based on the acquired image of the subject, including detecting at least one feature of the subject in the acquired image and determining the lighting condition based on a region of the acquired image corresponding to the detected at least one feature;
    determining a distance between the subject and the camera module during the acquisition based on the acquired image of the subject;
    determining whether to make a correction of the image exposure settings for the camera module based on the determined distance and the determined light condition; and
    responsive to determining to make the correction of the image exposure settings for the camera module:
        determining image exposure settings corresponding to the determined distance and to the determined light condition; and
        acquiring a new image of the subject using the determined image exposure settings.

2. The method of claim 1, wherein:
    wherein the image exposure settings comprise an exposure time value and a gain value for the image sensor; and
    determining the image exposure settings corresponding to the determined distance and to the determined light condition includes determining the image exposure settings corresponding to the determined distance from a look-up table for the determined light condition.

3. The method of claim 2, wherein in the look-up table for the determined light condition:
    the exposure time values increase with the corresponding distance values until reaching a maximum value; and
    after reaching the maximum value, the gain values increase with the corresponding distance values.

4. The method of claim 3, wherein until the exposure time values reach the maximum value the gain values increase with the corresponding distance values at a first rate, and after reaching of the maximum value the gain values increase with the corresponding distance values at a second rate higher than the first rate.

5. The method of claim 3, wherein until the exposure time values reach the maximum value the gain values are constant, and after the reaching of the maximum value the gain values start to increase with the corresponding distance values.

6. The method according to claim 2, wherein the look-up table is one of a plurality of look-up tables comprising a first look-up table, a second look-up table, and a third look-up table associated with an indoor condition, an outdoor overcast condition and an outdoor sunny condition, respectively.

7. The method of claim 2, wherein in the look-up table, a product of the exposure time and gain values increases with corresponding distance values.

8. The method of claim 1, wherein determining whether to make a correction of the image exposure settings for the camera module comprises determining whether at least one of the determined light condition and the determined distance is different than a predetermined light condition and a predetermined distance.

9. The method according to claim 8, wherein the predetermined light condition is an indoor condition, and wherein the predetermined distance is about 30 cm.

10. The method according to claim 1, wherein the at least one feature includes an anthropometric feature of the subject.

11. The method of claim 1, wherein the at least one feature is at least one eye portion within the acquired image.

12. The method of claim 11, wherein determining the light condition occurring during the acquisition of the image comprises:
   determining a value representative of a selected iris region of the at least one eye portion; and
   determining the light condition based at least in part on the determined value.

13. The method of claim 12, wherein determining the light condition based at least in part on the determined value includes:
   comparing the determined value with a threshold to determine whether an outdoor sunny condition occurred; and
   responsive to the determined value not exceeding the threshold:
      determining at least one region of interest in the acquired image other than the selected iris region, wherein the at least one region of interest in the acquired image other than the selected iris region is the detected at least one feature of the subject in the acquired image; and
      using a value representative of the at least one region of interest in a threshold comparison to discriminate between an indoor condition and an outdoor overcast condition.

14. An acquisition system comprising:
   an infra-red (IR) illumination source;
   an image sensor responsive to selected IR wavelengths; and
   image processor arranged for executing the operations of claim 1.

15. A computer program product comprising a non-transitory computer readable medium on which instructions are stored which, when executed on an image acquisition system, are configured for performing the operations of claim 1.

16. A system for automatically determining exposure settings for an image acquisition system, wherein the image acquisition system comprises an infra-red (IR) illumination source and an image sensor responsive to selected IR wavelengths, the system comprising a processor executing instructions to:
   acquire an image of a subject from a camera module while the subject is illuminated by the IR illumination source;
   determine a light condition from among an indoor light condition, an outdoor overcast light condition, and an outdoor sunny light condition present during the acquisition based on the acquired image of the subject, including detecting at least one feature of the subject in the acquired image and determining the lighting condition based on a region of the acquired image corresponding to the detected at least one feature;
   determine a distance between the subject and the camera module during the acquisition based on the acquired image of the subject;
   determine whether to make a correction of the image exposure settings for the camera module based on the determined distance and the determined light condition;
   responsive to determining to make the correction of the image exposure settings for the camera module:
      determining image exposure settings corresponding to the determined distance and to the determined light condition; and
      acquiring a new image of the subject using the determined image exposure settings.

17. The system according to claim 16, wherein the at least one feature includes an anthropometric feature of the subject.

18. The system of claim 16, wherein the at least one feature is at least one eye portion within the acquired image.

19. The system of claim 16, wherein determining the light condition occurring during the acquisition of the image comprises:
   determining a value representative of a selected iris region of the at least one eye portion; and
   determining the light condition based at least in part on the determined value.

20. The system of claim 19, wherein determining the light condition based at least in part on the determined value includes:
   comparing the determined value with a threshold to determine whether an outdoor sunny condition occurred; and
   responsive to the determined value not exceeding the threshold:
      determining at least one region of interest in the acquired image other than the selected iris region, wherein the at least one region of interest in the acquired image other than the selected iris region is the detected at least one feature of the subject in the acquired image; and
   using a value representative of the at least one region of interest in a threshold comparison to discriminate between an indoor condition and an outdoor overcast condition.

* * * * *